(12) United States Patent
Ono et al.

(10) Patent No.: US 9,126,564 B2
(45) Date of Patent: Sep. 8, 2015

(54) COMMUNICATION APPARATUS FOR VEHICLE

(75) Inventors: Masayoshi Ono, Tokyo (JP); Masato Sumida, Tokyo (JP); Tetsuya Ooba, Tokyo (JP); Masahiko Katayama, Tokyo (JP); Naohisa Uehara, Tokyo (JP)

(73) Assignee: MITSUBISHI DENKI KABUSHIKI KAISHA, Tokyo (JP)

( * ) Notice: Subject to any disclaimer, the term of this patent is extended or adjusted under 35 U.S.C. 154(b) by 1587 days.

(21) Appl. No.: 11/249,462

(22) Filed: Oct. 14, 2005

(65) Prior Publication Data

US 2007/0030119 A1    Feb. 8, 2007

(30) Foreign Application Priority Data

Aug. 7, 2005    (JP) .................................. 2005-199827

(51) Int. Cl.
*B60R 25/00*    (2013.01)
*B60R 25/24*    (2013.01)

(52) U.S. Cl.
CPC ....... *B60R 25/24* (2013.01); *G05B 2219/33192* (2013.01); *G05B 2219/36159* (2013.01)

(58) Field of Classification Search
CPC .......................... G07C 9/00896; G07C 9/00309
USPC ........................ 340/5.73, 5.6, 6.61, 5.64, 5.72
See application file for complete search history.

(56) References Cited

U.S. PATENT DOCUMENTS

| | | | |
|---|---|---|---|
| 6,072,383 A * | 6/2000 | Gallagher et al. ........... | 340/10.2 |
| 6,087,987 A * | 7/2000 | Bachhuber et al. ........... | 342/457 |
| 6,522,027 B1 * | 2/2003 | Morillon et al. ............. | 307/10.3 |
| 6,624,741 B1 * | 9/2003 | Dais et al. .................... | 340/5.72 |
| 6,853,296 B2 * | 2/2005 | Chandebois ............. | 340/426.28 |
| 6,998,958 B2 * | 2/2006 | Asakura et al. ............. | 340/5.61 |
| 7,034,657 B2 * | 4/2006 | Ueda et al. .................. | 340/5.62 |
| 2002/0130763 A1 * | 9/2002 | Aslanidis et al. ............ | 340/5.61 |

FOREIGN PATENT DOCUMENTS

| JP | 60-183246 A | 9/1985 |
|---|---|---|
| JP | 2003-221954 A | 8/2003 |

* cited by examiner

*Primary Examiner* — Vernal Brown
(74) *Attorney, Agent, or Firm* — Sughrue Mion, PLLC; Richard C. Turner

(57) ABSTRACT

A communication apparatus for a vehicle achieves reduction in size and cost of a portable unit by making unnecessary an oscillation circuit and a battery in the portable unit. The apparatus is provided with an on-board unit installed on the vehicle and a portable unit carried by a user of the vehicle. A response signal is sent from the portable unit to the on-board unit in response to a signal transmitted from the on-board unit. The portable unit includes a power generation circuit for supplying electric power to circuits in the portable unit by a power generation radio wave sent from the on-board unit, and the on-board unit sends a communication signal after sending the power generation radio wave.

4 Claims, 3 Drawing Sheets

COMMUNICATION APPARATUS FOR VEHICLE

BACKGROUND OF THE INVENTION

1. Field of the Invention

The present invention relates to a communication apparatus for a vehicle that is adapted to be applied to a vehicular electronic key system, etc., and more particularly, it relates to a suitable technique when an electronic key is applied to a passive entry system in which the electronic key operates as a portable unit to lock and unlock doors of a vehicle in a simple and easy manner.

2. Description of the Related Art

As a conventional communication apparatus for a vehicle, there has been known a vehicular lock control apparatus which uses an electronic key as a portable unit (see, for instance, a first patent document: Japanese examined patent application publication No. H03-60696).

The vehicular communication apparatus or vehicular lock control apparatus as described in the first patent document is provided with a portable unit (transmitter-receiver) having a microcomputer and a memory built therein, and the portable unit further has a transmitting and receiving antenna, a reception and demodulation circuit, a modulation circuit, and a carrier generation circuit.

In addition, a receiving section, an intrinsic signal verification section, a steering lock actuator, a lock state detection section, a portable unit detection section, a engine stop detection section, an unlock control unit, and a lock control section are arranged as telecommunications equipment on a vehicle side.

Now, reference will be made to the operation of the conventional vehicular communication apparatus as described in the first patent document.

First of all, on the vehicle side, the receiving section receives a predetermined intrinsic signal radio transmitted from a portable unit that has received a request signal from the vehicle side.

The intrinsic signal verification section verifies the intrinsic signal thus received with an intrinsic signal registration value that has been registered beforehand. When the intrinsic signal coincides with the intrinsic signal registration value, the lock state detection section detects a steering lock state at a time point when the verification is performed.

At this time, if a steering lock state is detected (i.e., the steering of the vehicle is in a locked state), the unlock control unit controls the steering lock actuator so as to carry out a steering unlocking operation.

In addition, when it is detected by the portable unit detection section that the portable unit is outside the passenger compartment of the vehicle, and when an engine stop state is detected by the engine stop detection section, the lock control section controls the steering lock actuator so as to carry out a steering locking operation.

On the other hand, in the portable unit, the request signal from the vehicle side is first received by a transmitting and receiving antenna, and is then demodulated by a reception and demodulation circuit to be input to the microcomputer, so that it is determined whether the signal thus input is a request signal.

When the input signal is a request signal from the vehicle side, a code signal inherent to the vehicle (portable unit), which has been stored in the memory beforehand, is read into the portable unit, and a pulse train signal corresponding to the intrinsic code signal thus read is impressed to the modulation circuit.

As a result, the intrinsic code signal modulated by a carrier wave output from a carrier oscillation circuit is sent from the transmitting and receiving antenna to the vehicle side.

In the conventional communication apparatus for a vehicle, there is a problem that the oscillation circuit need be built in the portable unit, and a power supply and a power supply circuit for driving a transmission and reception circuit (the oscillation circuit, the modulation circuit and the demodulation circuit), the microcomputer and the memory are also required.

In particular, though a battery can be used as the power supply for the portable unit, power consumption is large in the vehicular communication apparatus in which frequent communications are carried out between the portable unit and the vehicle side, so there is a problem that the battery life is short and the frequency of battery replacement becomes high.

Further, there is also a problem that the area occupied by the power supply circuit becomes large, thus resulting in an increase in size of the portable unit.

SUMMARY OF THE INVENTION

Accordingly, the present invention is intended to solve the problems as referred to above, and has for its object to obtain a communication apparatus for a vehicle which is capable of achieving reduction in size and cost of a portable unit by making unnecessary an oscillation circuit and a battery in the portable unit.

A communication apparatus for a vehicle according to the present invention includes an on-board unit installed on a vehicle, and a portable unit adapted to be carried by a user of the vehicle. A response signal is sent from the portable unit to the on-board unit in response to a signal transmitted from the on-board unit. The portable unit includes a power generation circuit for supplying electric power to circuits in the portable unit by a power generation radio wave sent from the on-board unit. The on-board unit sends a communication signal after sending the power generation radio wave.

According to the present invention, by the provision of a circuit that generates electric power to drive circuits in the portable unit upon reception a radio wave from the on-board unit, a power supply (battery, etc.) and an oscillation circuit in the portable unit are made unnecessary, whereby the area occupied by the circuits in the portable unit is reduced and battery replacement due to consumption of the battery life becomes unnecessary, thus making it possible to obtain a communication apparatus for a vehicle in which reduction in cost and size of the portable unit is achieved.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Hereinafter, preferred embodiments of the present invention will be described in detail while referring to the accompanying drawings.

Embodiment 1

Figure 1:
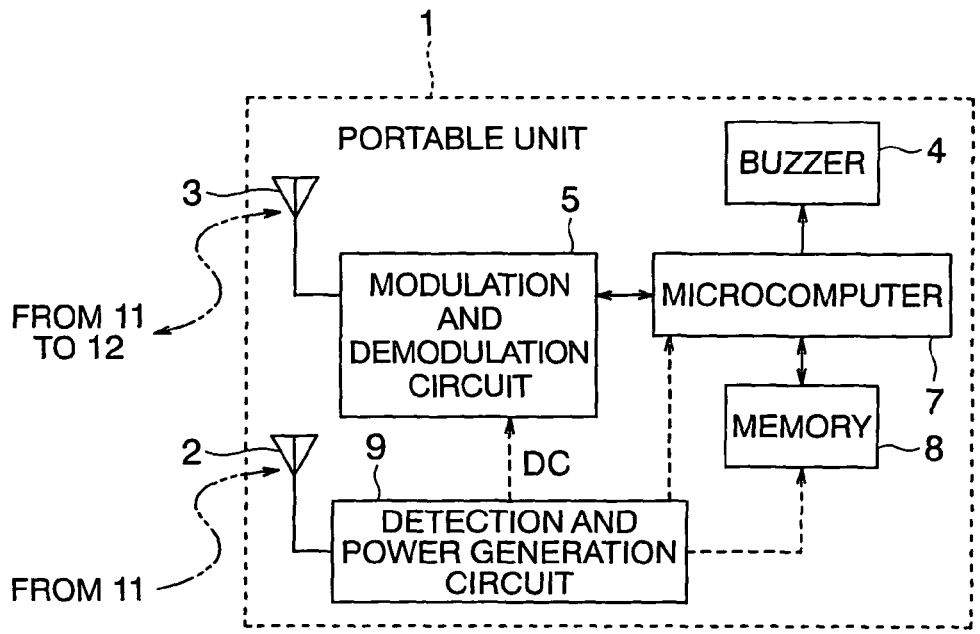
FIG. 1 is a block diagram showing a portable unit of a communication apparatus for a vehicle according to a first embodiment of the present invention.
Figure 2:
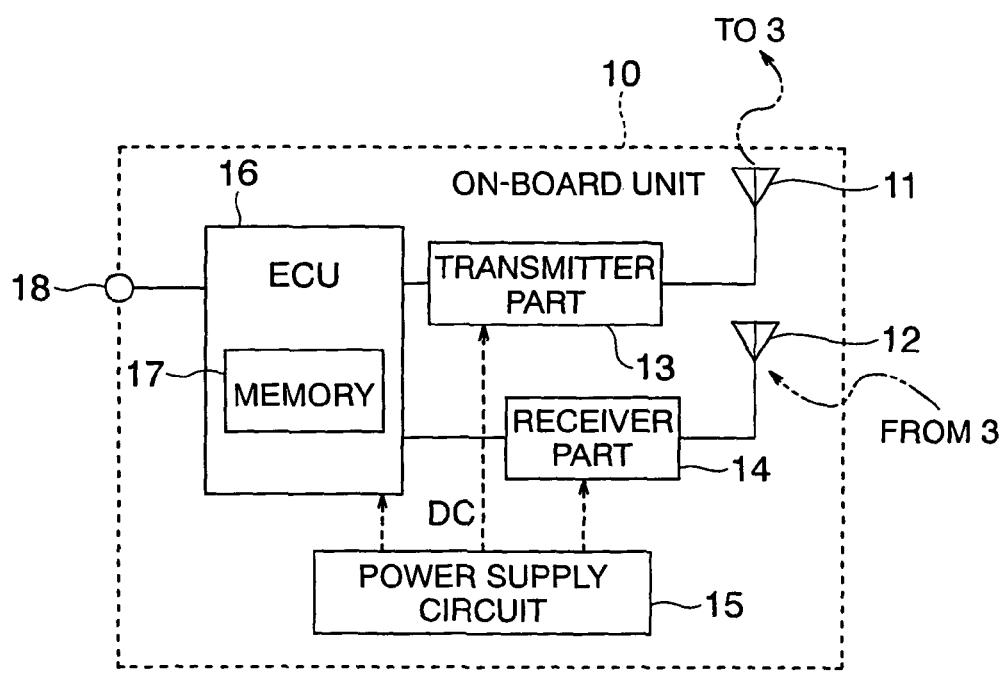
FIG. 2 is a block diagram showing an on-board unit of the communication apparatus for a vehicle according to the first embodiment of the present invention.

FIGS. 1 and 2 are block diagrams showing a communication apparatus for a vehicle according to a first embodiment of the present invention, wherein FIG. 1 shows the block configuration of a portable unit, and FIG. 2 shows the block configuration of an on-board unit.

In FIG. 1, the portable unit, generally designated at a reference numeral 1, includes a power generation receiving antenna 2, a transmitting and receiving antenna 3 for authentication (hereinafter referred to as an authentication transmitting and receiving antenna), a modulation and demodulation circuit 5 (including a modulation circuit for transmission and a demodulation circuit for reception) connected to the authentication transmitting and receiving antenna 3, a microcomputer 7 connected with the modulation demodulation circuit 5, a memory 8 belonging to the microcomputer 7, and a detection and power generation circuit 9 connected to the power generation receiving antenna 2. The authentication transmitting and receiving antenna 3 functions as a receiving circuit that receives a warning command.

The microcomputer 7 of the portable unit 1 can include a buzzer 4 as required, which functions as a warning section to generate a warning sound in response to a warning command.

The detection and power generation circuit 9 performs the detection of a received signal, and functions as a power supply circuit that is activated by the received signal to generate a voltage (or current). Electric power generated by the detection and power generation circuit 9 is supplied to the modulation and demodulation circuit 5, the microcomputer 7, and the memory 8.

In FIG. 2, the on-board unit 10 installed on a vehicle (not shown) includes a transmitting antenna 11, a receiving antenna 12, a transmitter part 13 connected to the transmitting antenna 11, a receiver part 14 connected to the receiving antenna 12, a power supply circuit 15 including a power supply, an ECU (electronic control unit) 16 connected to the transmitter part 13 and the receiver part 14, a memory 17 belonging to the ECU 16, and an on-board device control signal input/output terminal 18 connected to the ECU 16. The power supply circuit 15 feeds power to the transmitter part 13, the receiver part 14 and the ECU 16.

In addition, an authentication trigger signal is input from the on-board device (not shown) requiring operation authentication to the on-board device control signal input/output terminal 18, as necessary.

Next, the operation of this first embodiment of the present invention illustrated in FIGS. 1 and 2 will be described.

Reference will first be made to the case where an on-board device requires operation authentication and generates an authentication trigger signal to do an authentication operation. For instance, let us take an example where a user is going to open a door of a vehicle in case where the on-board device is a vehicle door locking and unlocking device.

First of all, in case where a detection signal is generated as an authentication trigger signal when a user's hand touches a door handle, the authentication trigger signal is impressed to the on-board device control signal input/output terminal 18 of the on-board unit 10 to be input to the ECU 16.

As a result, the ECU 16 outputs to the transmitter part 13 an instruction for sending a radio wave (hereinafter referred to as a "power generation radio wave") so as to generate electric power in the portable unit 1 as well as an instruction for sending an ID authentication request signal.

The transmitter part 13 sends a power generation radio wave and an ID authentication request signal to the portable unit 1 through the transmitting antenna 11 under the transmission instruction from the ECU 16.

In the portable unit 1, the power generation radio wave sent from the on-board unit 10 is received by the power generation receiving antenna 2, and converted into DC electric power by the detection and power generation circuit 9.

Electric power generated by the detection and power generation circuit 9 is supplied to the respective circuits in the portable unit 1, i.e., the modulation and demodulation circuit 5, the microcomputer 7 and the memory 8. As a result, all the circuits in the portable unit 1 are turned on into their operable state.

Hereinafter, the on-board unit 10 intermittently sends a power generation radio wave to the portable unit 1, so that an ID authentication request signal is sent from the on-board unit 10 to the portable unit 1 with the circuits in the portable unit 1 being held in their operable state. At this time, the power generation radio wave is being sent intermittently until a response signal from the portable unit 1 is received by the on-board unit 10, whereby electric power can be ensured in the portable unit 1 so as to enable the on-board unit 10 to receive the response signal in a reliable manner.

On the other hand, the portable unit 1 receives the ID authentication request signal from the on-board unit 10 at the authentication transmitting and receiving antenna 3.

Subsequently, in response to the signal thus received, the microcomputer 7 in the portable unit 1 reads in a unique ID signal specific or intrinsic to that portable unit 1 stored beforehand in the memory 8, and impresses a pulse train signal corresponding to the specific or intrinsic ID signal to the modulation and demodulation circuit 5.

At this time, the modulation and demodulation circuit 5 functions as a transmission modulation circuit to send back a modulation signal, which is modulated by the pulse train signal from the authentication transmitting and receiving antenna 3, to the on-board unit 10.

Thereafter, the modulation signal received by the receiving antenna 12 of the on-board unit 10 is demodulated, in the receiver part 14, into an ID signal specific or intrinsic to the portable unit 1, and is then input to the ECU 16.

The ECU 16 verifies whether the input ID signal specific or intrinsic to the portable unit 1 coincides with the ID signal registration value of the portable unit 1 that is beforehand registered in the memory 17.

When it is determined that the specific or intrinsic ID signal send back from the portable unit 1 coincides with the ID signal registration value of the portable unit 1 in the memory 17, the ECU 16 outputs an authentication signal indicating that the on-board device is operable from the on-board device control signal input/output terminal 18 to the on-board device.

In the above-mentioned series of authentication operations, all the circuits in the portable unit 1 are operated by the DC electric power that is converted by the detection and power generation circuit 9 on the basis of the power generation radio wave sent from the on-board unit 10. As a result, any power supply for the portable unit 1 and any power supply circuit associated therewith are not required at all.

Accordingly, a battery in the portable unit 1 is unnecessary, and the time and effort for battery replacement or the like due to the consumption of electric power are not required, thus making it possible to simplify the circuit configuration of the portable unit 1 itself as well as to achieve reduction in size and cost thereof.

Embodiment 2

Though not particularly mentioned in the above first embodiment, it may be possible to specify the position of the portable unit 1 on the side of the on-board unit 10 based on a response signal (ID signal) from the portable unit 1.

Hereinafter, reference will be made to a communication apparatus for a vehicle according to a second embodiment of the present invention in which the on-board unit 10 has a function of locating the position of the portable unit 1, while referring to FIG. 3 through FIG. 5.

In this case, the on-board unit 10 is constructed in such a manner that it sends or transmits a power generation radio wave and an authentication request signal for on-board device control to the portable unit 1 a plurality of times while changing the transmission power levels thereof, and specifies or locates the positions of the portable unit 1 at time points at which ID signals are received, based on the reception states of the ID signals from the portable unit 1 corresponding to the plurality of transmissions.

Figure 3:
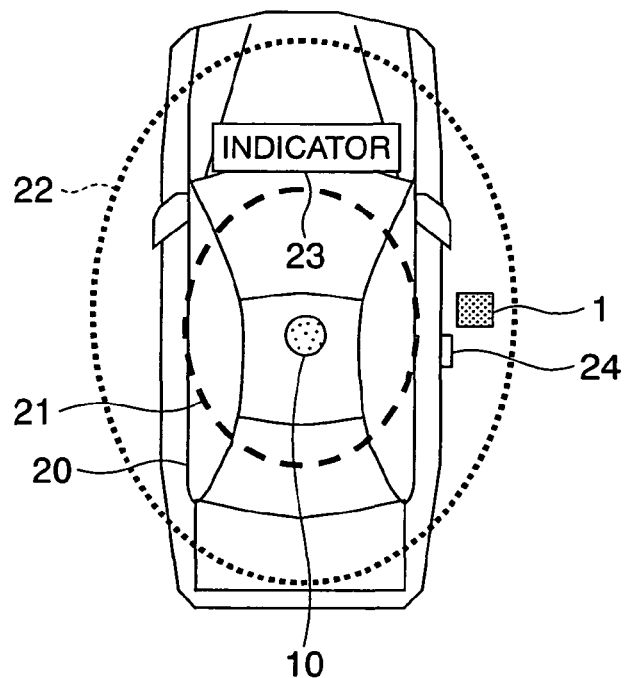
FIG. 3 is an explanatory view schematically showing a communication state between an on-board unit and a portable unit lying outside a passenger compartment of a vehicle according to a second embodiment of the present invention.
Figure 4:
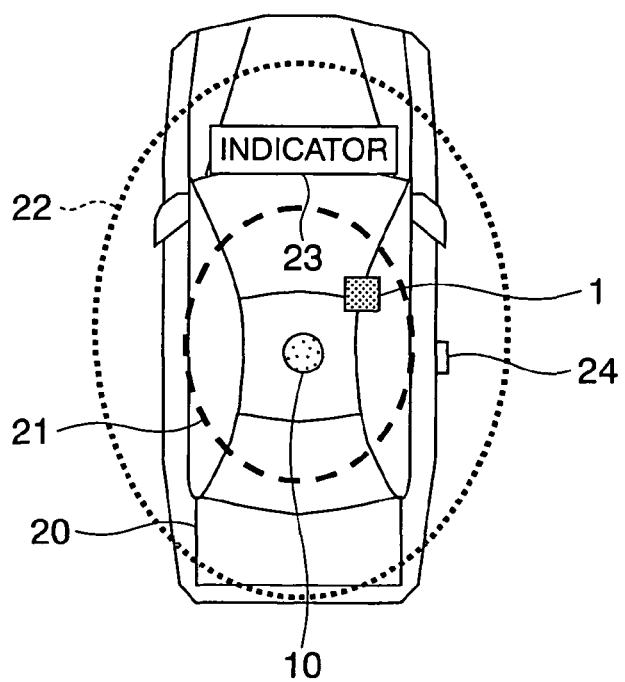
FIG. 4 is an explanatory view schematically showing a communication state between the on-board unit and the portable unit lying inside the passenger compartment according to the second embodiment of the present invention.

FIGS. 3 and 4 are explanatory views that schematically show different communication states between the on-board unit 10 and the portable unit 1 according to the second embodiment of the present invention, wherein FIG. 3 illustrates the case where the portable unit 1 exists outside a passenger compartment of a vehicle, and FIG. 4 illustrates the case where the portable unit 1 exists in the passenger compartment.

In FIGS. 3 and 4, the same or like parts or elements as those described above (see FIG. 1) are identified by the same symbols while omitting a detailed description thereof. In addition, a basic arrangement is as FIG. 1 and FIG. 2.

The on-board unit 10 is arranged in a main body 20 of a vehicle, and has a relatively narrow communication possible range 21 (see a broken line frame) and a relatively wide communication possible range 22 (see a dotted line frame) around the vehicle main body 20 in a stepped or staged manner.

An indicator 23 is installed on an indicator panel at a driver's seat in the vehicle main body 20 for indicating the position of the portable unit 1, and a lock switch 24 adapted to be controlled by a user is installed on an outer side of a door of the vehicle.

Next, reference will be made to the operation of the second embodiment of the present invention while referring to FIGS. 3 and 4.

In either the cases of FIG. 3 and FIG. 4, the on-board unit 10 authenticates permission or nonpermission of the operation of an on-board device by means of communications with the portable unit 1, as described above. At this time, a basic authentication operation between the on-board unit 10 and the portable unit 1 is substantially similar to that as described above, but the method of sending or transmitting a power generation radio wave and an authentication request signal from the on-board unit 10 as well as the contents of authentication in the ECU 16 after the demodulation of a response signal (modulation signal) from the portable unit 1 are different from those in the above-mentioned first embodiment.

Specifically, the on-board unit 10 has, as a communication possible range between itself and the portable unit 1, the relatively narrow communication possible range 21 that covers a narrow region, i.e., the passenger compartment, of the vehicle main body 20 and the relatively wide communication possible range 22 that covers an area outside the passenger compartment of the vehicle main body 20, as stated above, and it sends a power generation radio wave and an authentication request signal with two-stage transmission powers P1, P2 (P1<P2) corresponding to the communication possible ranges 21, 22, respectively.

For instance, when the portable unit 1 exists outside the passenger compartment of the vehicle main body 20, as shown in FIG. 3, the on-board unit 10 can authenticate the intrinsic ID signal of the portable unit 1 only when sending the power generation radio wave and the authentication request signal with the transmission power P2 that covers the communication possible range 22.

On the other hand, when the portable unit 1 exists inside the passenger compartment of the vehicle main body 20, as shown in FIG. 4, the on-board unit 10 can authenticate the intrinsic ID signal of the portable unit 1 when sending the power generation radio wave and the authentication request signal with either of the transmission powers P1, P2 that cover the communication possible ranges 21, 22, respectively.

In addition, the ECU 16 in the on-board unit 10 executes not only the processing of authenticating the ID signal of the portable unit 1 but also the processing of specifying or locating the position of the portable unit 1. At this time, the position of the portable unit 1 is determined based on the reception state of the ID signal from the portable unit 1 when transmission is made by changing the transmission power in the two steps or stages P1, P2.

That is, only when the ID signal from the portable unit 1 can be received with transmission being made from the on-board unit 10 with the transmission power P2, it is determined that the portable unit 1 exists outside the passenger compartment, whereas when the ID signal from the portable unit 1 can be received with transmission being made even with either of the transmission powers P1, P2, it is determined that the portable unit 1 exists inside the passenger compartment.

Thus, by changing the transmission power from the on-board unit 10 stepwise or in stages, and verifying the reception state of the response signal from the portable unit 1, it is possible to determine the position of the portable unit 1.

Next, reference will be made to the operation of the second embodiment of the present invention while referring to FIG. 5.

Figure 5:
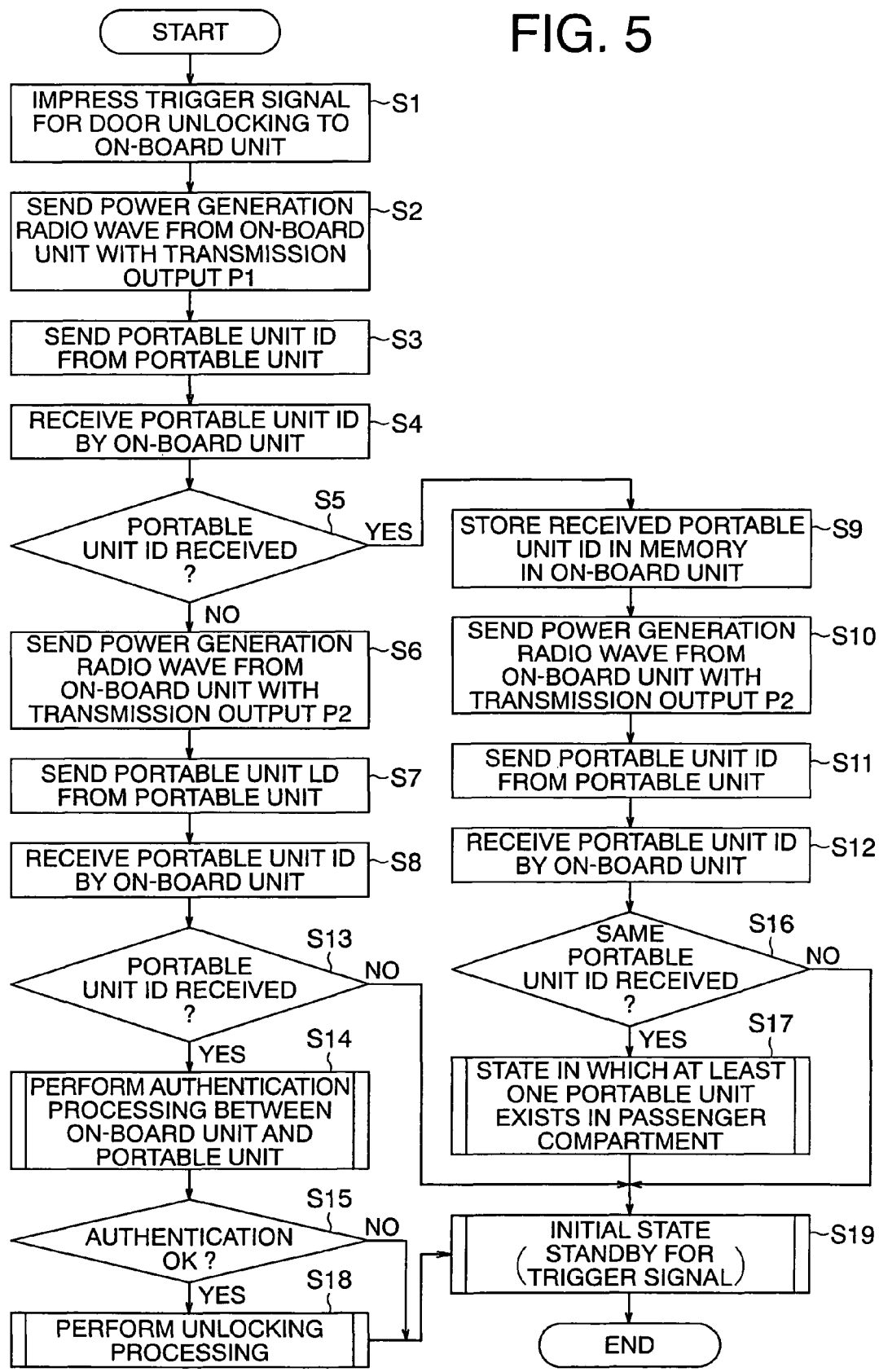
FIG. 5 is a flow chart showing a determination processing operation for unlocking a door according to the second embodiment of the present invention.

FIG. 5 is a flow chart showing the communication operations of the portable unit 1 and the on-board unit 10 according to the second embodiment of the present invention, wherein the operations of these units are illustrated this when the user of the vehicle carrying the portable unit 1 approaches the vehicle main body 20.

Here, taking as an example the case where the on-board device is a door locking and unlocking device, reference will be made to an operation in which when the user carrying the portable unit 1 approaches the vehicle main body 20, the on-board unit 10 verifies that the portable unit 1 exists outside the passenger compartment, and unlocks the doors of the vehicle.

In FIG. 5, first of all, when the user carrying the portable unit 1 approaches the vehicle main body 20, an authentication trigger detection circuit (not shown) mounted on the vehicle detects the moment when the user touches a door handle while trying to open a door for instance, and impresses a detection signal to the on-board unit 10 as an authentication trigger signal (step S1).

Then, in response to the authentication trigger signal, the on-board unit 10 sends a power generation radio wave and an ID authentication request signal with the transmission power P1 corresponding to the narrow communication possible range 21 (step S2).

Subsequently, the portable unit 1 is activated upon receipt of the transmitted signals (the power generation radio wave and the ID authentication request signal) from the on-board unit 10 to generate an ID signal (portable unit ID) specific or intrinsic to the portable unit 1 (step S3).

Thereafter, the on-board unit 10 receives the portable unit ID generated or send by the portable unit 1 (step S4), and compares the portable unit ID thus received with the ID registration value registered in the on-board unit 10 so as to determine whether the portable unit ID coincides with the ID registration value (step S5).

When it is determined in step S5 that the portable unit ID coincides with the ID registration value in the on-board unit 10 (that is, Yes), the control flow proceeds to step S9 (to be described later).

whereas when it is determined in step S5 that the portable unit ID does not coincide with the ID registration value in the on-board unit 10 (that is, No), the on-board unit 10 sends a power generation radio wave and an ID authentication request signal with the transmission power P2 corresponding to the wide communication possible range 22 (step S6).

Here, note that when it is determined in step S5 that the portable unit ID coincides with the ID registration value in the on-board unit 10 (that is, Yes), it is meant that the portable unit 1 exists inside the passenger compartment, whereas when it is determined that the portable unit ID does not coincide with the ID registration value or that the portable unit ID can not be received (that is, No), it is meant that the portable unit 1 does not exist inside the passenger compartment.

Subsequent to step S6, the portable unit 1 sends the portable unit ID upon receipt of the transmitted signals (the power generation radio wave and the ID authentication request signal) based on the increased transmission power P2 (step S7).

Hereinafter, the on-board unit 10 receives the portable unit ID (step S8), and performs ID determination processing similar to the above step S5 (step S13).

When it is determined in step S13 that the portable unit ID coincides with the ID registration value in the on-board unit 10 (that is, Yes), it is recognized that the portable unit 1 exists outside the passenger compartment, and the on-board unit 10 executes the authentication processing between itself and the portable unit 1 (step S14) to determine whether the result of the ID authentication is OK (in coincidence) (step S15).

When it is determined in step S15 that the portable unit ID coincides with the ID registration value in the on-board unit 10 (that is, Yes), it is recognized that the authentication is OK, and door unlock processing is carried out (step S18), after which the control flow advances to a standby or waiting state for an authentication trigger signal at the initial stage (step S19), and the processing routine of FIG. 5 is terminated.

On the other hand, when it is determined in step S15 that the portable unit ID does not coincide with the ID registration value in the on-board unit 10 or that the portable unit ID can not be received (that is, No), the control flow advances to a standby state for a trigger signal at once (step S19).

Here, note that when it is determined in step S15 that the portable unit ID does not coincide with the ID registration value or that the ID signal cannot be received, it is assumed that the user carries a portable unit 1 of another vehicle which is not registered in the on-board unit 10, or that a suspicious person or the like touches the door handle.

On the other hand, when the control flow proceeds to step S9 as a result of a determination in the above step S5 that the ID signal of the portable unit 1 coincides with the ID signal registration value (that is, Yes), the on-board unit 10 stores the portable unit ID received at the time of transmission with the transmission power P1 (the communication possible range 21) into the memory 17 in the on-board unit 10.

In addition, subsequent to step S9, the on-board unit 10 generates a power generation radio wave and an ID authentication request signal with the transmission power P2 (the communication possible range 22) (step S10).

As a result, the portable unit 1 sends the portable unit ID in response to the power generation radio wave and the ID authentication request signal of the transmission power P2 (step S11), and the on-board unit 10 receives the portable unit ID (step S12). The above steps S10 through S12 correspond to the above-mentioned steps S6 through S8, respectively.

Hereinafter, a comparison is made between the portable unit ID and the ID registration value in the on-board unit 10, and when the portable unit ID coincides with the ID registration value in the on-board unit 10, it is determined whether the ID signal comes from the same portable unit 1 (step S16).

Specifically, in step S16, the on-board unit 10 makes a comparison between the current portable unit ID and the last portable unit ID stored in the memory 17 in the above-mentioned step S9, and when it is determined that both of them coincide with each other (that is, Yes), it is recognized the at least one portable unit 1 exists inside the passenger compartment (step S17), and the control flow advances to a standby state for the following authentication trigger signal (step S19).

On the other hand, when it is determined in step S16 that the current portable unit ID does not coincide with the last portable unit ID stored in the memory 17 (that is, No), it is recognized that there exist one portable unit 1 inside the passenger compartment and another portable unit 1 outside the passenger compartment, and the control flow immediately advances to a standby state for an authentication trigger signal (step S19).

In other words, in step S17, there is one portable unit 1 existing in the passenger compartment, so it is assumed that the processing of unlocking the doors is unnecessary, and hence the processing routine of FIG. 5 is terminated without executing door unlocking authentication processing (step S15) and door unlocking processing (step S18).

Here, note that the state in step S17 occurs, for example, in case where a person carrying no portable unit 1 is going to lock the doors from outside the passenger compartment when the user carrying a portable unit 1 has already ridden into the passenger compartment and locked the doors.

If, in this case, the user in the passenger compartment recognizes the person carrying no portable unit 1 and makes a determination that it is necessary to unlock the doors, the user can unlock the doors by hand, whereas if the person in question is a suspicious one, the user can keep the doors locked without unlocking the doors.

According to this second embodiment of the present invention, door unlocking processing is never executed when it is determined that the portable unit 1 exists inside the passenger compartment of a vehicle. Accordingly, it is possible to prevent a suspicious person from unlocking the doors of the vehicle from outside without permission after the user has already gotten on the vehicle.

On the other hand, when the user carrying the portable unit 1 is away from the vehicle main body 20, the ECU 16 in the on-board unit 10 operates to lock the doors of the vehicle by controlling the on-board device (e.g., a door locking and unlocking device) after making a determination, based on the transmission power P1 corresponding to the narrow communication possible range 21, that the portable unit 1 does not exist in the vehicle.

As locking execution timing at this time, there can be considered the cases when the lock switch 24 installed on the outer side of a door of the vehicle is pushed, and when a response signal from the portable unit 1 is interrupted with respect to the signal transmission with the transmission power P1 from the on-board unit 10.

For instance, when the user presses the lock switch 24 installed on the exterior of a door of the vehicle, the on-board unit 10 can lock the doors immediately after verifying that the portable unit 1 does not exist inside the vehicle.

Here, note that when the portable unit 1 exists in the passenger compartment in spite of the user having pressed the lock switch 24 on the door exterior, there is a possibility of leaving the portable unit 1 behind in the passenger compartment while the user is going away from the vehicle main body 20, so the locking of the doors is inhibited.

Additionally, at this time, the on-board unit 10 may serve to assist the user in finding the portable unit 1, for example, by sending a warning command to the portable unit 1 thereby to sound the buzzer 4 of the portable unit 1.

In this case, it is necessary to construct the portable unit 1 such that the portable unit 1 is provided with the buzzer 4 and is also able to receive the warning command from the on-board unit 10.

Moreover, in case where there are a plurality of portable units 1 and the user who is going away from the vehicle main body 20 carries one portable unit 1 with another portable unit being left in the passenger compartment, it may be possible to identify the portable unit left in the passenger compartment by its portable unit ID so that only the buzzer of the portable unit in the passenger compartment can be sounded.

Further, by communicating from the on-board unit 10 to the portable unit 1, the buzzer of the portable unit 1 can be operated to sound, whereby the user is assisted to find the portable unit 1.

Furthermore, transmission may be intermittently made from the on-board unit 10 to the portable unit 1, so that the doors of the vehicle can be locked at a time point when communications between the on-board unit 10 and the portable unit 1 are interrupted or stopped after the engine of the vehicle is stopped.

In this case, by adjusting the transmission power of the on-board unit 10 in such a manner that the communication possible range (distance) from the on-board unit 10 to the portable unit 1 becomes about 3 m-5 m, the doors of the vehicle can automatically be locked even when the user carrying the portable unit 1 is away from the vehicle without pressing the lock switch 24, and hence it becomes further effective from the standpoint of crime prevention.

As described above, according to the authentication processing of the second embodiment of the present invention, advantageous effects similar to those of the above-mentioned first embodiment can basically be obtained, and in addition, the location of the portable unit 1 can be specified by changing the power level of the transmission from the on-board unit 10. Accordingly, it becomes possible to specify the location of the portable unit 1 (i.e., whether the portable unit 1 exists inside or outside the passenger compartment) in addition to the aforementioned advantageous effect of achieving reduction in size and cost of the portable unit 1. As a result, it is possible to avoid the confinement of the portable unit 1 in a locked-in state due to the leaving thereof in the passenger compartment as well as engine starting by the use of a portable unit 1 other than those registered.

Although in the above-mentioned second embodiment, the transmission power level of the on-board unit 10 is set in two steps or stages (P1, P2), it may be divided into three or more arbitrary number of levels so as to subdivide the communication possible range.

In this case, the location accuracy of the portable unit 1 becomes high, and hence, by indicating the position of the portable unit 1 with the indicator 23 on the indicator panel of the dashboard in the passenger compartment, for example, it is possible to assist the user in finding the portable unit 1 even when the user has lost the portable unit 1.

In addition, although description has been made to the case where the on-board unit 10 is provided with one transmitting antenna 11 and one receiving antenna 12, a plurality of transmitting antennas 11 and a plurality of receiving antennas 12 can be provided on one on-board unit 10 at locations mutually different from one another so as to accordingly define the communication possible range, while achieving similar advantageous effects as stated above.

Moreover, the use of one portable unit 1 has mainly been described, but in case where there are a plurality of portable units 1, the positions of the portable units can be individually specified by registering the ID signals which are different from one another for the portable units, respectively.

Further, although in the above-mentioned first and second embodiments, description has been made by taking as an example the case where a door locking and unlocking device is used as an on-board device that requires authentication processing, it is needless to say that the present invention can be applied to other on-board devices such as, for instance, a starter switch for engine starting, etc.

Furthermore, although no reference has particularly been made to the frequency used for communications, the present invention is applicable to apparatuses that uses micro waves such as those of a UHF band, a 900 MHz band, a 950 MHz band, a 2.4 GHz band, etc.

While the invention has been described in terms of preferred embodiments, those skilled in the art will recognize that the invention can be practiced with modifications within the spirit and scope of the appended claims.

What is claimed is:

1. A communication apparatus for a vehicle comprising:
an on-board unit installed on a vehicle; and
a portable unit adapted to be carried by a user of said vehicle;
wherein a response signal is sent from said portable unit to said on-board unit in response to a signal transmitted from said on-board unit;
said portable unit includes a power generation circuit for supplying electric power to circuits in said portable unit by a power generation radio wave sent from said on-board unit;
said on-board unit sends a communication signal, which is separate from said power generation radio wave, after sending said power generation radio wave;
said communication signal is an authentication request signal to verify operation permission of an on-board device installed on said vehicle;
said portable unit sends an ID signal specific to itself as said response signal in response to said authentication request signal;

said on-board unit generates an authentication signal to permit the operation of said on-board device after verifying that the ID signal received from said portable unit coincides with an ID signal registration value stored beforehand;

said on-board unit sequentially transmits said power generation radio wave and said authentication request signal at first and second transmission power levels respectively covering a communicable area inside and outside said vehicle, and said on-board unit is a door locking and unlocking device for said vehicle, wherein when said ID signal of said portable unit is received at said first transmission power level, it is determined that said portable unit exists inside the vehicle, so that said on-board unit prohibits said door locking and unlocking device from executing unlocking processing of said doors while the portable unit exists inside the vehicle, and when said ID signal of said portable unit is not received at said first transmission power level and then said ID signal of said portable unit is received at said second transmission power level subsequent to said first transmission power level where said ID signal of said portable unit coincides with said ID signal registration value, it is determined that said portable unit exists outside the vehicle, so that said on-board device makes said door locking and unlocking device execute unlocking processing of said doors.

2. The communication apparatus for a vehicle as set forth in claim 1,
wherein said on-board unit sends a warning command when it is determined that said portable unit exists in a passenger compartment of said vehicle upon pressing of said lock switch; and
said portable unit is provided with a receiving circuit that receives said warning command and a warning section for generating a warning sound in response to said warning command.

3. The communication apparatus for a vehicle as set forth in claim 1, further comprising an indicator installed on said vehicle,
wherein said on-board unit makes the position of said portable unit indicated on said indicator.

4. A communication apparatus for a vehicle as recited in claim 1,
further comprising an indicator installed on said vehicle,
wherein said vehicle includes a lock switch and an on-board unit makes the position of said portable unit within a passenger compartment of the vehicle indicated on said indicator upon operation of said lock switch.

* * * * *